United States Patent
Niccoli

[11] 3,785,339
[45] Jan. 15, 1974

[54] WEATHER INDICATING INSTRUMENT
[75] Inventor: George J. Niccoli, Chicago, Ill.
[73] Assignee: Airguide Instrument Company, Chicago, Ill.
[22] Filed: Oct. 24, 1972
[21] Appl. No.: 300,423

[52] U.S. Cl. ............................... 116/129 R, 73/387
[51] Int. Cl. ............................................... G09f 9/00
[58] Field of Search ............ 116/129, 129 A, 129 B; 73/384, 387, 388, 393

[56] References Cited
UNITED STATES PATENTS

| | | | |
|---|---|---|---|
| 739,126 | 9/1903 | Vives | 73/384 |
| 1,160,426 | 11/1915 | Manning | 116/129 A |
| 1,734,183 | 11/1929 | Shore | 116/129 B |
| 3,204,600 | 9/1965 | Aldridge et al. | 116/129 R |

Primary Examiner—Louis J. Capozi
Attorney—Axel A. Hofgren et al.

[57] ABSTRACT

A weather instrument for indicating atmospheric pressure and expected weather conditions incident to falling and rising barometric conditions, including a stationary panel with a circular scale for indicating atmospheric pressure, an angularly adjustable transparent dial concentric with the pressure scale and having a reference line together with indicia at opposite sides thereof to indicate weather expectations, and a barometric device responsive to atmospheric pressure having an angularly movable needle over the pressure scale and the transparent dial, in an arrangement which permits the adjustable dial to be set with reference to the needle, wherever the needle is positioned, so that subsequent movement of the needle relative to the adjustable dial indicates not only atmospheric pressure but also expected weather conditions incident to falling and rising atmospheric conditions.

5 Claims, 6 Drawing Figures

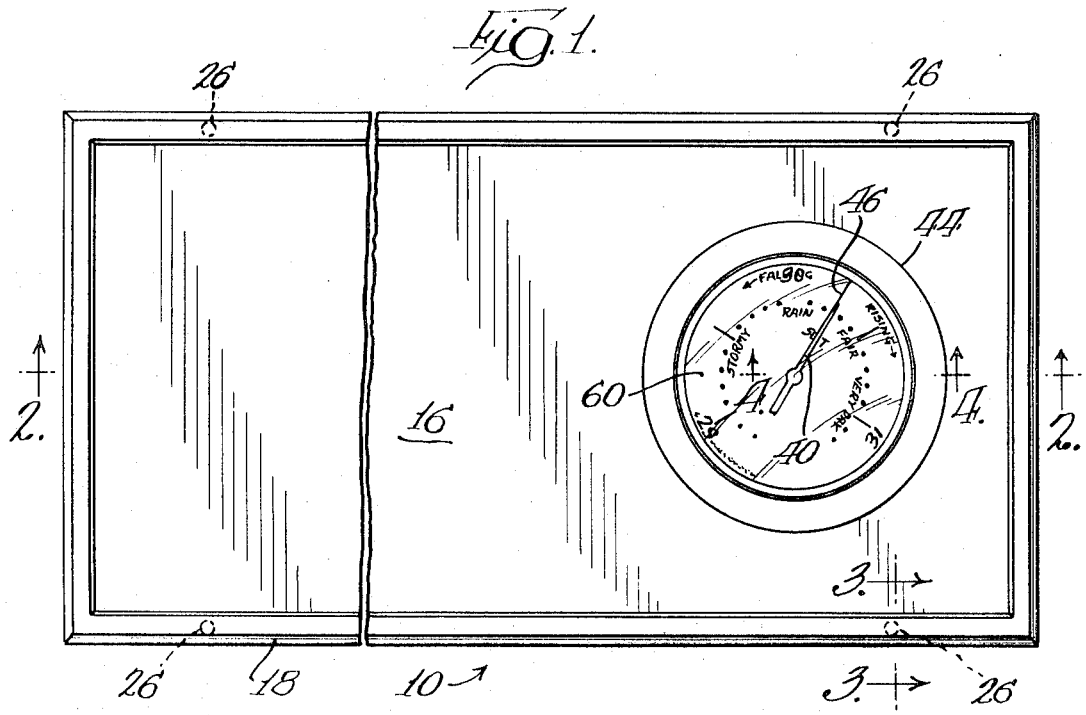
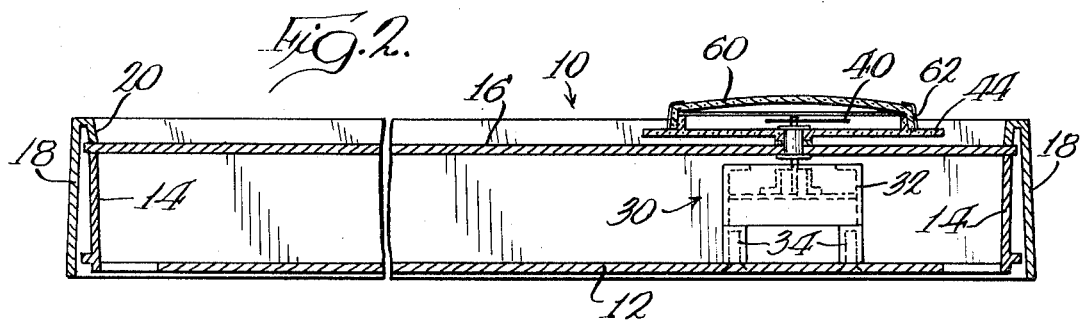
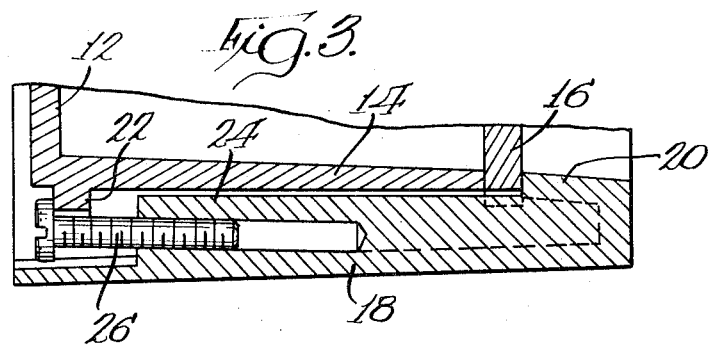

WEATHER INDICATING INSTRUMENT

BACKGROUND OF THE INVENTION

The invention relates to a weather instrument for indicating atmospheric pressure and expected weather conditions incident to falling and rising barometric conditions. In the past, there have been some devices which undertake to convey similar information. For example, U.S. Pat. No. 3,204,600 relates to such a device. However, prior devices have been subject to some disadvantage in that the angularly movable needle for indicating barometric pressure has been partially obscured by an overlying dial with markings which partially mask the underlying area. It would be desirable to provide an instrument in which the needle is readily visible so that the instrument may be easily read in varying light conditions.

BRIEF SUMMARY OF THE INVENTION

The present invention contemplates a weather indicating instrument including a stationary panel with a circular scale for indicating atmospheric pressure, a transparent dial mounted on the stationary panel concentric with the pressure scale and including a reference line together with indicia at opposite sides of the reference line for indicating expected weather conditions incident to falling and rising pressures, a device responsive to atmospheric pressure including a needle shaft extending through the stationary panel and the transparent dial, and a needle on the outboard end of the needle shaft movable relative to the pressure scale and the transparent dial responsive to changes in atmospheric conditions.

In order to accomodate the barometer needle shaft so that the needle is disposed over both the pressure scale and the adjustable dial, a tubular eyelet surrounds the needle shaft and extends through the stationary panel and the adjustable dial. A frictional washer is mounted on the tubular eyelet between the panel and the dial, and outwardly extending flanges on the opposite ends of the eyelet grip the panel and the dial to hold the dial yieldably in adjusted positions.

In the preferred embodiment illustrated, a transparent cover is provided over the needle with an outer perimeter of the cover secured to the outer perimeter of the adjustable dial to define a manually accessible knob facilitating adjustment of the dial.

BRIEF DESCRIPTION OF THE DRAWINGS

FIG. 1 is a front elevational view of a weather indicating instrument embodying the principles of the present invention, with a portion broken away;

FIG. 2 is a transverse cross-sectional view taken at about the line 2—2 of FIG. 1;

FIG. 3 is an enlarged fragmentary sectional view taken at about the line 3—3 of FIG. 1;

DETAILED DESCRIPTION OF PREFERRED EMBODIMENT

Figure 4:
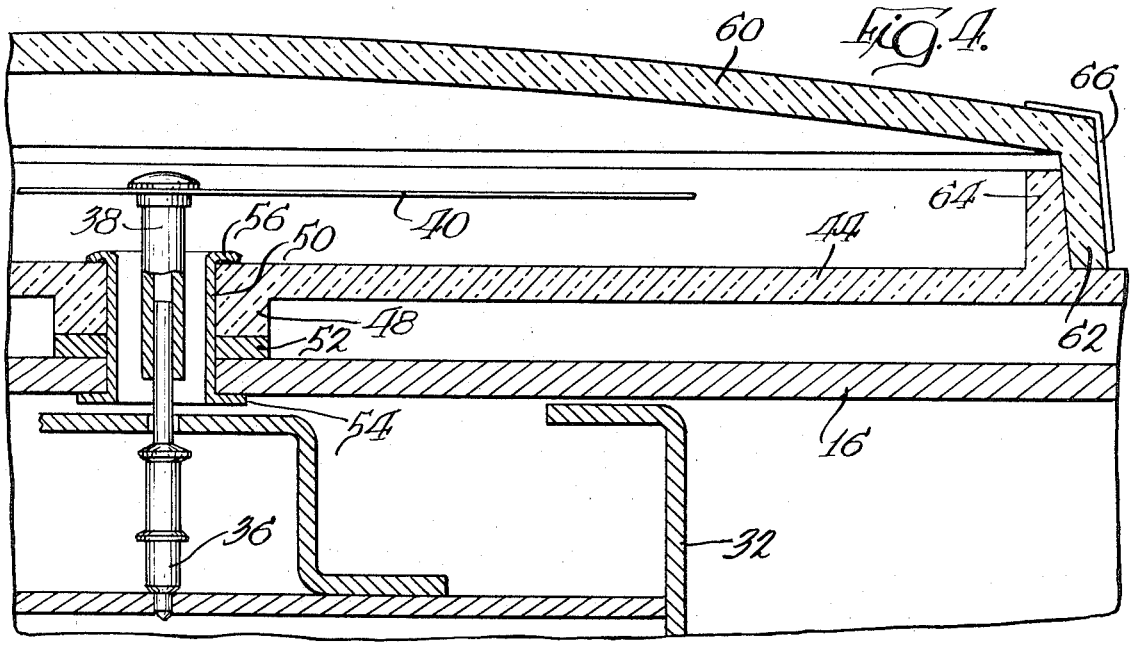
FIG. 4 is an enlarged fragmentary cross-sectional view taken at about the line 4—4 of FIG. 1.
Figure 5:
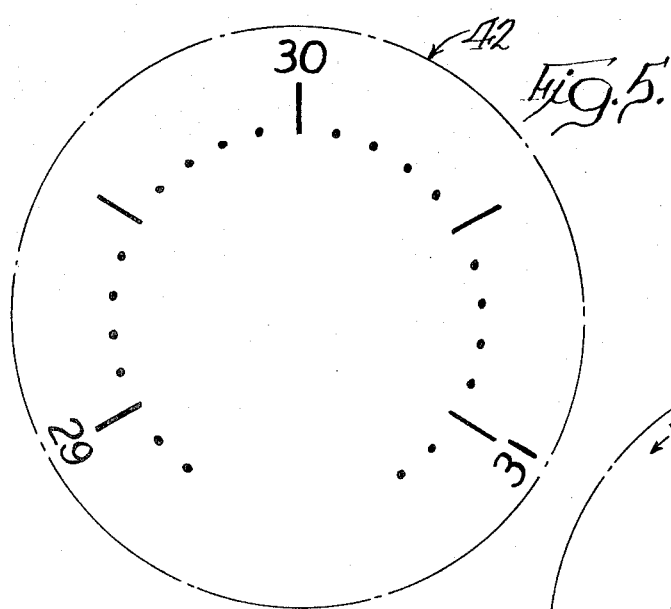
FIG. 5 is a plan of the atmospheric pressure scale.

Referring to the drawings in detail, a weather instrument 10 embodying the principles of the present invention includes a base plate or back panel 12 of generally rectangular configuration and including an outstanding flange 14 along the perimeter adapted to support the perimeter of a rectangular front panel 16. The front panel 16 is secured in position on the support 14 by means of a case or cover 18 surrounding the flange 14 and including an inwardly and downwardly directed flange 20 engageable with the perimeter of the panel 16. As best seen in FIG. 3, the back panel 12 includes a plurality of mounting lugs 22 adapted to register with corresponding bosses 24 on the case 18. The mounting lugs 22 are apertured or recessed to accept screws as at 26 threadable into the bosses 24. When the screws 26 are tightened, the front panel 16 is held between the flanges 14 and 20.

As best seen in FIGS. 1 and 2, a barometric device 30 is mounted on the back panel 12 adjacent one end thereof to cooperate with indicia on the front panel 16. The remaining area of the back panel 12 and the front panel 16 may be utilized as desired, for example, to support other instruments such as a thermometer or a hygrometer. If desired, the front panel 16 may be utilized for a scenic display or to display weather information. As best seen in FIG. 2, the barometric device 30 includes a housing 32 supported by spacers 34 appropriately secured to the back panel 12. The specific mechanism in the housing 32 is not important to the present invention and is not illustrated in detail, except to show a needle shaft 36 rotatably mounted in appropriate bearing means in the housing 32. The shaft 36 is mounted to move angularly in response to variations in barometric pressure. The outboard end of the shaft 36 carries a tubular extension 38 secured thereon to rotate with the shaft. The extension 38 has a radially disposed needle 40 which is utilized in conjunction with a pressure scale 42 provided on the outer surface of the front panel 16. The scale 42 includes an arcuate array of angularly spaced indicia representative of atmospheric pressure in terms of inches of mercury.

Figure 6:
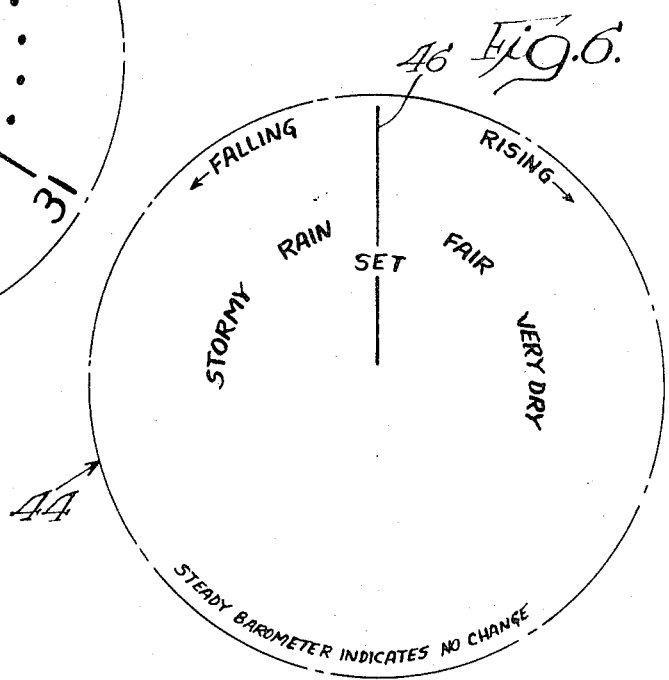
FIG. 6 is a plan of the indicia on the adjustable transparent dial.

In conjunction with the pressure scale 42, and adjustable dial 44 is mounted concentrically about the barometer needle shaft 36 and includes a reference line 46 together with indicia at opposite sides of the reference line 46 for indicating a falling barometer and a rising barometer, as well as weather conditions expected to accompany the falling or rising atmospheric pressures. As viewed in FIG. 6, at the left of the reference line 46, the dial 44 includes the term "FALLING" in reference to decreasing atmospheric pressure which might be expected to produce unsettled conditions indicated by the terms "RAIN" and "STORMY." To the right of the reference line 46, the dial includes the term "RISING" intended to refer to conditions when the atmospheric pressure is increasing, when the weather might be expected to be good as indicated by the terms "FAIR" and "VERY DRY."

The adjustable dial 44 is made of appropriate transparent material so that the pressure scale 42 may be read through the dial 44. In order to mount the dial 44, it is formed with a central hub 48 carried on a tubular eyelet 50 which is mounted on the front panel 16 centrally of the pressure scale 42 and accomodates the needle shaft 36 and its extension 38. In order to yieldably retain the adjustable transparent dial in various angularly adjusted positions, a frictional washer 52 is mounted on the tubular eyelet 50 between the front panel 16 and the dial hub 48, and opposite ends of the eyelet 50 are formed with outwardly turned flanges as at 54 and 56 respectively engaging the front panel 16 and the adjustable dial 44. Preferably, the washer 52 is made of rubber, and the pressure of the flanges 54 and 56 is sufficient to retain the dial 44 in adjusted positions while permitting manual adjustment of the dial when desired.

The needle 40 is protected by a transparent crystal or cover 60 which may be domed as best seen in FIGS. 2 and 4, and which includes an outer peripheral flange 62 secured to an outstanding circular flange 64 on the dial 44. Preferably, the flanges are secured together by suitable cement, and the flange 62 includes a protective covering ring 66, so that the cover 60 may be manually grasped as a knob for purposes of angularly adjusting the dial 44.

In use of the weather instrument as described above, the atmospheric pressure scale 42 is stationary on the front panel 16 and visible through the adjustable dial 44 and the transparent cover 60, so that as the needle 40 moves angularly over the pressure scale, the needle indicates atmospheric pressure. In order to utilize the apparatus to indicate expected weather conditions accompanying rising or falling atmospheric conditions, the adjustable transparent dial 44 may be set at any given time with the reference line 46 coincident with the needle 40. Afterward, when the needle moves responsive to changes in atmospheric conditions, it will move into one or the other of the zones labeled "FALLING" or "RISING" on the adjustable dial 44 to indicate either that unsettled weather conditions may be expected or that good weather conditions may be expected. The transparent cover 60 ensures that the needle 40 is readily visible, and that the adjustable dial 44 is also readily visible, while the pressure scale 42 is viewable through the adjustable dial.

I claim:

1. A weather indicating instrument, comprising,
   a. a base,
   b. a front panel mounted on the base and having an arcuate scale with angularly spaced indicia for indicating barometric pressure,
   c. a tubular eyelet extending through the front panel centrally of the circular scale,
   d. a barometric device responsive to barometric pressure mounted on the base and having a needle shaft extending through the eyelet and angularly movable on changes in barometric pressure,
   e. a transparent dial concentric with the circular scale having a central portion mounted on the eyelet for angular adjustment and including a reference line and indicia at opposite sides thereof for indicating weather expectations incident to falling and rising barometric conditions,
   f. means on the eyelet yieldably retaining the transparent dial in adjusted positions, and
   g. a needle on the outboard end of the needle shaft movable around the circular scale and the transparent dial.

2. A weather indicating instrument as defined in claim 1, including a washer on the tubular eyelet between the front panel and the transparent dial, and outwardly extending flanges on opposite ends of the eyelet engaging the front panel and the transparent dial to hold the dial in adjusted position.

3. A weather indicating instrument as defined in claim 1, including a transparent cover over the needle having an outer perimeter secured to the transparent dial and defining a manually accessible knob.

4. A weather indicating instrument comprising,
   a. a base,
   b. a front panel mounted on the base and having a circular scale with indicia for indicating barometric pressure,
   c. a transparent dial mounted for angular adjustment on the front panel concentric with the circular scale and including a reference line and indicia at opposite sides thereof for indicating weather expectations incident to falling and rising barometric conditions,
   d. a barometric device responsive to barometric pressure mounted on the base and having a needle shaft extending through the front panel and transparent dial and angularly movable on changes in barometric pressure,
   e. a needle on the outboard end of the needle shaft movable over the indicia of the circular scale and the transparent dial, and
   f. a transparent cover over the needle and the dial having an outer perimeter secured to the outer perimeter of the transparent dial.

5. A weather indicating instrument comprising,
   a. a base,
   b. a front panel mounted on the base and having a circular scale with indicia for indicating barometric pressure,
   c. a transparent dial mounted on the front panel concentric with the circular scale and including a reference line and indicia at opposite sides thereof for indicating weather expectations incident to falling and rising barometric conditions,
   d. a barometric device responsive to barometric pressure mounted on the base and having a needle shaft extending through the front panel and transparent dial and angularly movable on changes in barometric pressure,
   e. a needle on the outboard end of the needle shaft movable around the circular scale and the transparent dial,
   f. a transparent cover over the needle having an outer perimeter secured to the outer perimeter of the transparent dial,
   g. a tubular eyelet around the needle shaft extending through the front panel and transparent dial,
   h. a frictional washer on the tubular eyelet between the front panel and the transparent dial, and
   i. outwardly extending flanges on opposite ends of the eyelet engaging the front panel and the transparent dial to hold the dial in adjusted positions.

* * * * *